March 6, 1962 N. G. NORDQVIST 3,024,414
DEVICE FOR MEASURING AND INDICATING
THE SPEED OF A VEHICLE
Filed June 17, 1958
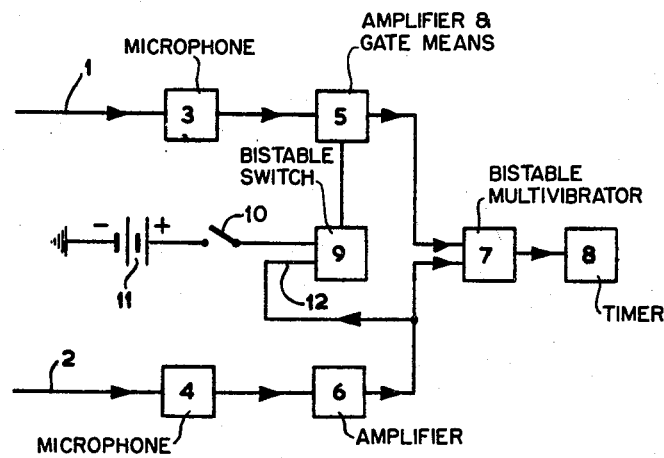
INVENTOR
NILS GÖSTA NORDQVIST
BY
AGENT

United States Patent Office 3,024,414
Patented Mar. 6, 1962

3,024,414
DEVICE FOR MEASURING AND INDICATING THE SPEED OF A VEHICLE
Nils Gösta Nordqvist, Stockholm, Sweden, assignor to North American Philips Company, Inc., New York, N.Y., a corporation of Delaware
Filed June 17, 1958, Ser. No. 742,643
Claims priority, application Sweden June 20, 1957
4 Claims. (Cl. 324—70)

The present invention relates to a device for measuring and indicating the speed of a passing vehicle. More particularly, the invention relates to a device for measuring and indicating the speed of a passing vehicle by means of a first and a second feeling device provided at a predetermined distance from each other on and across the road or path of the vehicle. The feeling devices, when in contact with one pair of wheels of the vehicle, each produce an electric pulse with a mutual time distance depending on the speed of the vehicle. The pulses are fed to the control device of a time measuring member, so that the pulse produced by the first feeling device causes the control device to start the time measuring member and the pulse produced by the second feeling device causes the control device to stop the time measuring member.

In order to avoid the pulses produced by the contact of the remaining pairs of wheels of the vehicle from influencing the time measuring member, a gate circuit is provided according to the invention, between the first feeling device and the control device. The gate circuit is controlled by a switching unit, which has a non-operative position, in which the gate circuit is blocked, and an operative position, in which the gate circuit is unblocked, the switching unit being so arranged that it manually can be switched over into its operative position so that, when a vehicle passes over the first feeling device, the pulse produced by it can pass the gate circuit and cause the time measuring device to start, and then is restored into its non-operative position by the pulse produced by the second feeling device, which pulse is fed to the switching unit and causes the time measuring member to stop.

The switching unit controlling the gate circuit consists suitably of a bistable multivibrator with two separate input terminals, one of which is momentarily connectable to a voltage source, and the other one is connected to the second feeling device, so that the switching unit can be switched over into its operative position by connecting the voltage source to the one input terminal. The switching unit is then restored to its non-operative position by a pulse from the second feeling device fed to the other input terminal.

Similarly the control device of the time measuring member consists suitably of a bistable multivibrator with two separate terminals, which are connected to the feeling devices so that the time measuring member, when it is started by a pulse from the first feeling device, cannot stop before a pulse is produced by the second device. The moment at which the time measuring member is started and stopped, will be determined extremely exactly by the pulses, because the multivibrator is quick-acting at the same moment as a pulse is being produced. Furthermore, at a distance between the feeling devices which is larger than the wheel base of the vehicle when at first the first and then the second device will produce each two pulses, only the first pulse incoming to the input terminals of the multivibrator will actuate the time measuring member.

The invention is more closely explained in the following with reference to the annexed drawing, which schematically shows an embodiment of the device according to the invention.

Both the feeling devices consist here of two thin metal wires 1, 2, fastened on and stretched over the road or path of the vehicle. The wires 1 and 2 are each connected with a microphone 3, 4, respectively, so that, when a metal wire is brought into mechanical oscillation by contact with the wheels of a passing vehicle, the microphone connected with the wire produces an electric pulse. The microphones 3, 4 are connected each via an amplifier 5, 6, of which amplifier 5 also serves as a gate circuit, to the input terminals on the bistable multivibrator 7. The time measuring member 8 connected to the multivibrator 7 is caused to start or to stop by a pulse produced by the microphone 3 or 4 respectively. The switching unit 9, which also comprises a bistable multivibrator with separate input terminals, controls the amplifier 5 so, that at a momentary closing of the switch 10, whereby the voltage source 11 is connected to the one input terminal of the multivibrator 9, the amplifier 5 is unblocked, which state lasts until a pulse produced by the microphone 4 comes in at the other input terminal 12 of the multivibrator 9, and the amplifier 5 is blocked.

The working manner of the device is the following. When a vehicle, the speed of which is to be measured, approaches the feeling devices 1 and 2, the amplifier 5 is unblocked by the switch 10 manually being closed for a moment. At the contact between the front pair of wheels and the metal wire 1, a pulse is produced by the microphone 3, which pulse is amplified by the amplifier 5 and is fed to one of the input terminals of the multivibrator 7 to start the time measuring member. At the contact between the front pair of wheels and the metal wire 2, another pulse is produced by the microphone 4, which pulse is amplified by the amplifier 6 and is fed to the other input of the multivibrator 7 causing the time measuring member to stop. The second pulse is also fed to the second input 12 of the multivibrator 9, blocking the amplifier 5 and preventing further pulses produced by the microphone 3, for instance those which are produced at the contact between the rear pair of wheels of the vehicle and the metal wire 1, from actuating the time measuring member.

What is claimed is:

1. A device for measuring and indicating the speed of a passing vehicle, comprising first means for producing an electric pulse upon operative contact between the said first means and the wheels of said vehicle, second means for producing an electric pulse upon operative contact between the said second means and the wheels of said vehicle, said second means being positioned at a predetermined distance from said first means in a manner whereby the wheels of said vehicle contact the said second means at a time after said wheels contact the said first means dependent upon the speed of the said vehicle, time measuring means, first control means for starting and stopping said time measuring means under the control of an electric pulse, first connecting means for supplying pulses produced by said first pulse producing means to said first control means in a manner whereby a pulse produced by the said first pulse producing means operates the said first control means to start said time measuring means, second connecting means for supplying pulses produced by said second pulse producing means to said first control means in a manner whereby a pulse produced by the said second pulse producing means operates the said first control means to stop said time measuring means, amplifying and gating means included in said first connecting means and interposed between said first pulse producing means and said first control means, second amplifying means included in said second connecting means and interposed between said second pulse producing means and said first control means, second control means for blocking and unblocking said gating means under the control of an electric pulse, means connecting said second control means to said gating means, and means for operating said second control means to unblock said gating means thereby permitting a pulse produced by said first pulse producing means to operate said first control means to start said time measuring means, said second control means being operated by a pulse produced by said second pulse producing means to block said gating means thereby preventing a subsequent pulse produced by said first pulse producing means from operating said first control means.

2. A device for measuring and indicating the speed of a passing vehicle, comprising first means for producing an electric pulse upon operative contact between the said first means and the wheels of said vehicle, second means for producing an electric pulse upon operative contact between the said second means and the wheels of said vehicle, said second means being positioned at a predetermined distance from said first means in a manner whereby the wheels of said vehicle contact the said second means at a time after said wheels contact the said first means dependent upon the speed of the said vehicle, time measuring means, first control means for starting and stopping said time measuring means under the control of an electric pulse, first connecting means for supplying pulses produced by said first pulse producing means to said first control means in a manner whereby a pulse produced by said first pulse producing means operates the said first control means to start said time measuring means, second connecting means for supplying pulses produced by said second pulse producing means to said first control means in a manner whereby a pulse produced by the said second pulse producing means operates the said first control means to stop said time measuring means, amplifying and gating means included in said first connecting means and interposed between said first pulse producing means and said first control means, second amplifying means included in said second connecting means and interposed between said second pulse producing means and said first control means, second control means for blocking and unblocking said gating means under the control of an electric pulse, said second control means comprising a bistable multivibrator having two input terminals and an output, a source of voltage, means connecting the output of said multivibrator to said gating means, switching means connecting one of said input terminals of said multivibrator to said voltage source thereby unblocking said gating means and permitting a pulse produced by said first pulse producing means to operate said first control means to start said time measuring means, and means connecting the other of said input terminals of said multivibrator to the output of said second amplifying means thereby operating said multivibrator by a pulse produced by said second pulse producing means to block said gating means and preventing a subsequent pulse produced by said first pulse producing means from operating said first control means.

3. A device for measuring and indicating the speed of a passing vehicle, comprising first means for producing an electric pulse upon operative contact between the said first means and the wheels of said vehicle, second means for producing an electric pulse upon operative contact between the said second means and the wheels of said vehicle, said second means being positioned at a predetermined distance from said first means in a manner whereby the wheels of said vehicle contact the said second means at a time after said wheels contact the said first means dependent upon the speed of the said vehicle, time measuring means, first control means for starting and stopping said time measuring means under the control of an electric pulse, said first control means comprising a bistable multivibrator having two input terminals and an output connected to said time measuring means, first connecting means for supplying pulses produced by said first pulse producing means to one of said input terminals of said multivibrator in a manner whereby a pulse produced by the said first pulse producing means operates the said multivibrator to start said time measuring means, second connecting means for supplying pulses produced by said second pulse producing means to the other of said input terminals of said multivibrator in a manner whereby a pulse produced by the said second pulse producing means operates the said multivibrator to stop said time measuring means, amplifying and gating means included in said first connecting means and interposed between said first pulse producing means and said first control means, second amplifying means included in said second connecting means and interposed between said second pulse producing means and said first control means, second control means for blocking and unblocking said gating means under the control of an electric pulse, means connecting said second control means to said gating means, and means for operating said second control means to unblock said gating means thereby permitting a pulse produced by said first pulse producing means to operate said first control means to start said time measuring means, said second control means being operated by a pulse produced by said second pulse producing means to block said gating means thereby preventing a subsequent pulse produced by said first pulse producing means from operating said first control means.

4. A device for measuring and indicating the speed of a passing vehicle, comprising first means for producing an electric pulse upon operative contact between the said first means and the wheels of said vehicle, second means for producing an electric pulse upon operative contact between the said second means and the wheels of said vehicle, said second means being positioned at a predetermined distance from said first means in a manner whereby the wheels of said vehicle contact the said second means at a time after said wheels contact the said first means dependent upon the speed of the said vehicle, said predetermined distance being greater than the wheelbase of said vehicle, time measuring means, first control means for starting and stopping said time measuring means under the control of an electric pulse, said first control means comprising a first bistable multivibrator having two input terminals and an output connected to said time measuring means, first connecting means for supplying pulses produced by said first pulse producing means to one of said input terminals of said first multivibrator in a manner whereby a pulse produced by the said first pulse producing means operates the said first multivibrator to start said time measuring means, second connecting means for supplying pulses produced by said second pulse producing means to the other of said input terminals of said first multivibrator in a manner whereby a pulse produced by the said second pulse producing means operates the said first multivibrator to stop said time measuring means, amplifying and gating means included in said first connecting means and interposed between said first pulse producing means and said first control means, second amplifying means included in said second connecting means and interposed between said second pulse producing means and said first control means, second control means for blocking and unblocking said gating means under the control of an electric pulse, said second control means comprising a second bistable multivibrator having two input terminals and an output, a source of voltage, means connecting the output of said second multivibrator to said gating means, switching means connecting one of said input terminals of said second multivibrator to said voltage source thereby unblocking said gating means and permitting a pulse produced by said first pulse producing means to operate said first control means to start said time measuring means, and means connecting the other of said input terminals of said second multivibrator to the output of said second amplifying means thereby operating said second multivibrator by a pulse produced by said second pulse producing means to block said gating means and preventing a subsequent pulse produced by said first pulse producing means from operating said first control means.

References Cited in the file of this patent
UNITED STATES PATENTS

| | | |
|---|---|---|
| 2,576,415 | Prather | Nov. 27, 1951 |
| 2,635,692 | Scheske | Apr. 21, 1953 |
| 2,795,273 | Putnam | June 11, 1957 |
| 2,831,162 | Gross | Apr. 15, 1958 |